United States Patent
Young et al.

(10) Patent No.: US 6,622,933 B1
(45) Date of Patent: Sep. 23, 2003

(54) PRESSURE SEQUENCE CONTROLLED VALVE AND SPRINKLER SYSTEM USING SAME

(76) Inventors: George A. Young, 39 Fallen Leaf Rd., Holbrook, NY (US) 11741; Jonathan R. Young, 39 Fallen Leaf Rd., Holbrook, NY (US) 11741

( * ) Notice: Subject to any disclaimer, the term of this patent is extended or adjusted under 35 U.S.C. 154(b) by 0 days.

(21) Appl. No.: 09/855,123

(22) Filed: May 14, 2001

Related U.S. Application Data
(60) Provisional application No. 60/203,821, filed on May 12, 2000.

(51) Int. Cl.[7] .............................................. A01G 25/02
(52) U.S. Cl. ............................. 239/66; 239/69; 239/70; 239/201; 239/207; 137/624.14; 137/624.18
(58) Field of Search ............................. 239/66, 69, 70, 239/200, 201, 207, 569, 570, DIG. 15; 137/624.13, 624.14, 624.18

(56) References Cited

U.S. PATENT DOCUMENTS

| | | | | |
|---|---|---|---|---|
| 2,360,321 A | * | 10/1944 | Griswold | 239/66 |
| 3,027,094 A | * | 3/1962 | Phillips | 239/70 |
| 3,147,770 A | | 9/1964 | Perlis | |
| 3,402,890 A | * | 9/1968 | Heitzman | 137/624.18 |
| 3,502,269 A | | 3/1970 | Robertson | |
| 3,637,139 A | | 1/1972 | Felix | |
| 3,853,145 A | | 12/1974 | Judd | |
| 4,003,402 A | * | 1/1977 | Corliss et al. | 239/66 |
| 4,092,995 A | | 6/1978 | Stubenruss | |
| 4,116,216 A | | 9/1978 | Rosenberg | |
| 4,212,088 A | | 7/1980 | Goettl | |
| 4,265,403 A | | 5/1981 | Bonetti | |
| 4,407,451 A | * | 10/1983 | Hunter | 137/624.14 |
| 4,632,361 A | | 12/1986 | Callison | |
| 4,212,088 A | | 3/1988 | Goettl | |
| 5,100,056 A | | 3/1992 | Theodorsen et al. | |
| 5,135,168 A | * | 8/1992 | Wang | 239/66 |

FOREIGN PATENT DOCUMENTS

| | | |
|---|---|---|
| DE | 2820960 | 7/1978 |
| SU | 1042684 | 9/1983 |
| SU | 1521402 | 11/1989 |

* cited by examiner

Primary Examiner—Steven J. Ganey
(74) Attorney, Agent, or Firm—Cowan, Liebowitz & Latman, PC; Mark Montague

(57) ABSTRACT

A lawn sprinkler system utilizes a master controller whose input is coupled to a water supply and whose output is coupled via pipe to a number of valves. The master controller is preprogrammed to supply water for a number of phases of operation, where the operation advances to a subsequent phase upon turning the supply of water off for a relatively short amount of time followed by turning the supply of water back on. Each of the valves includes an in-port and an out-port, where each valve cycles through each of the phases as controlled by the master controller. Each valve is setable/changeable to supply water to its respective out-port during a selected phase of operation.

13 Claims, 11 Drawing Sheets

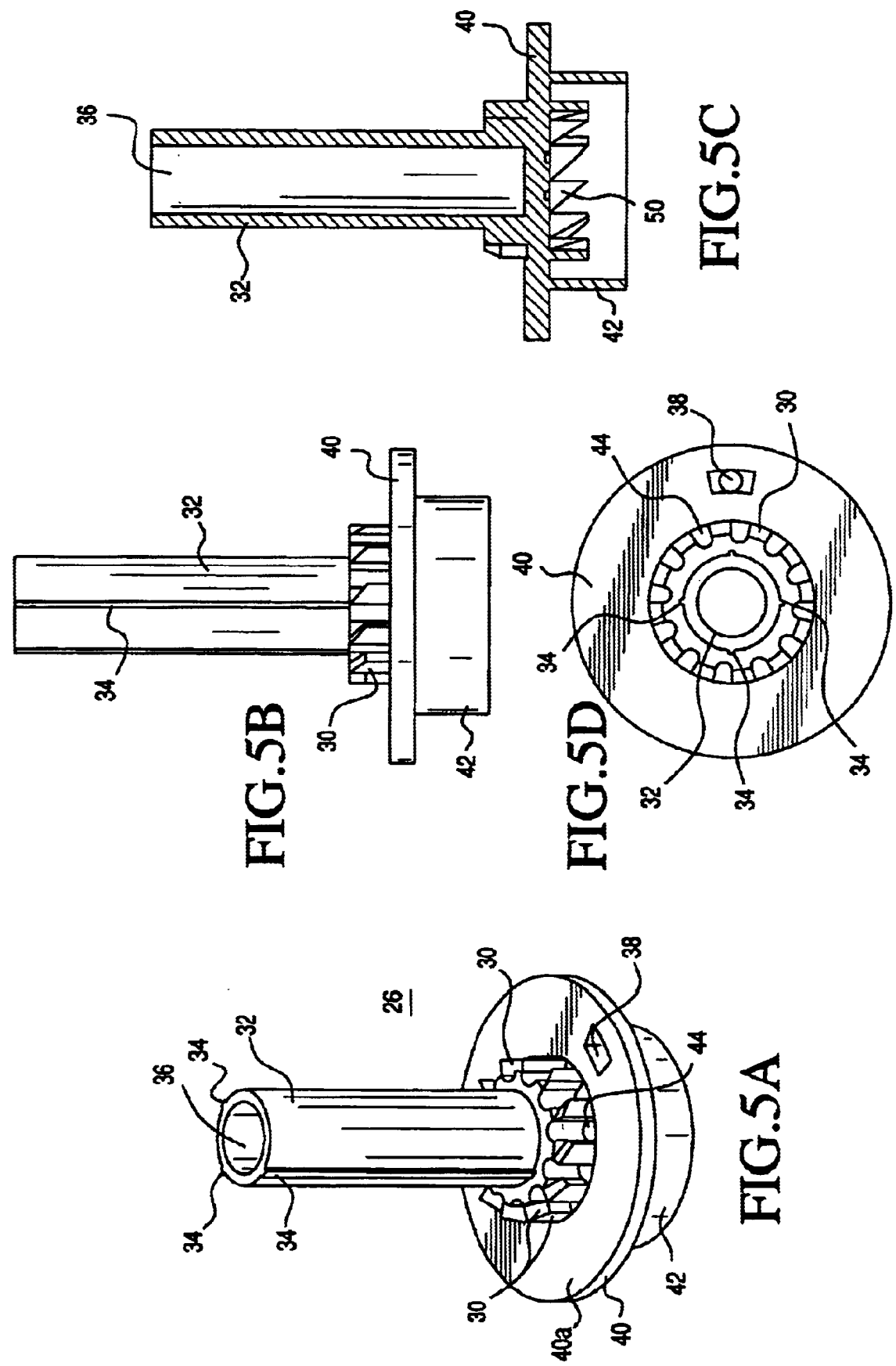

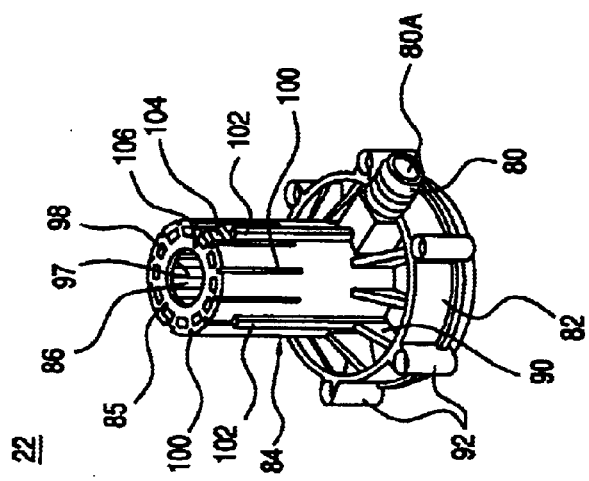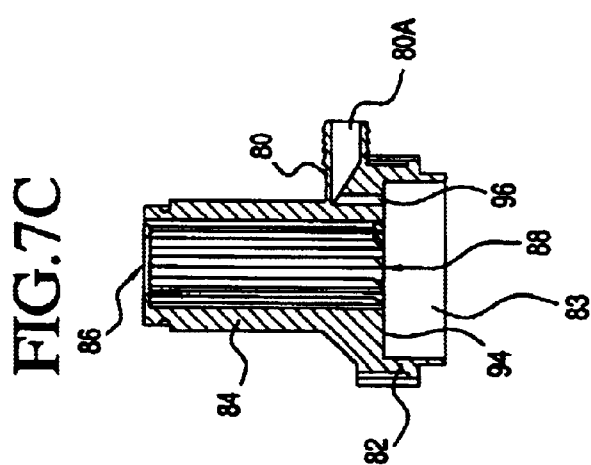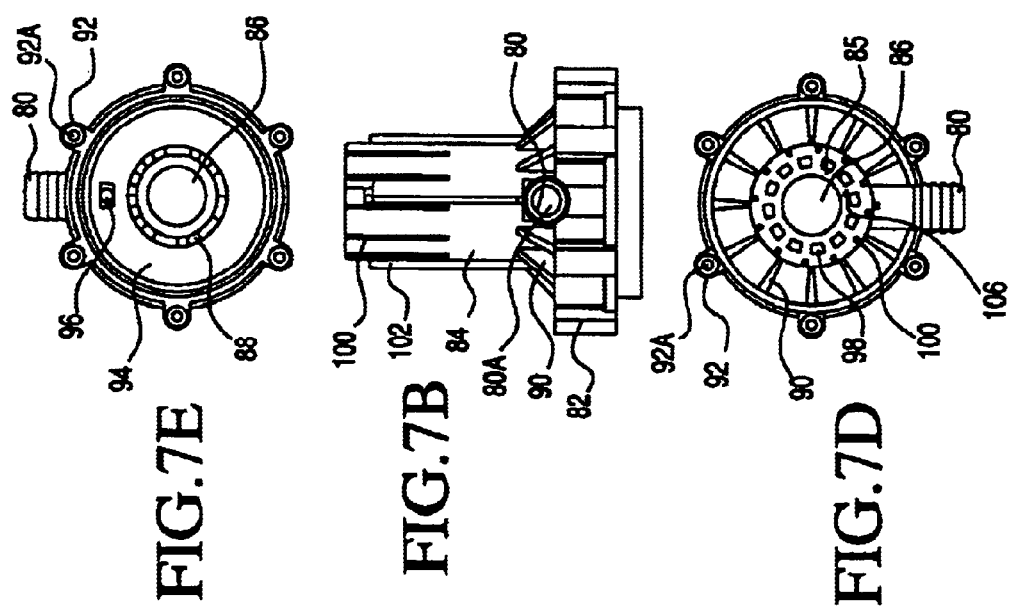

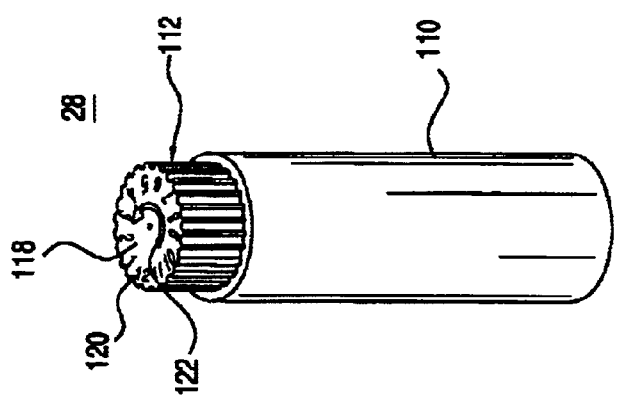
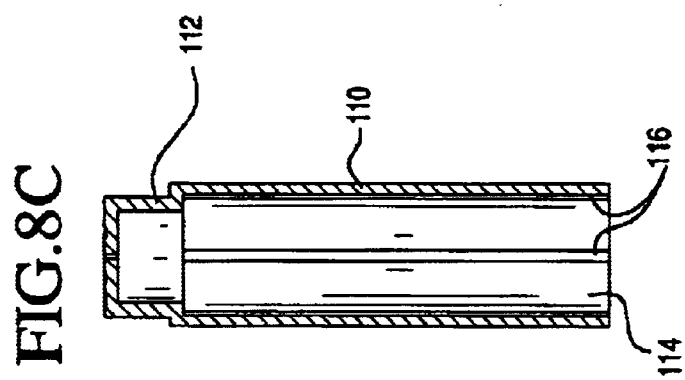
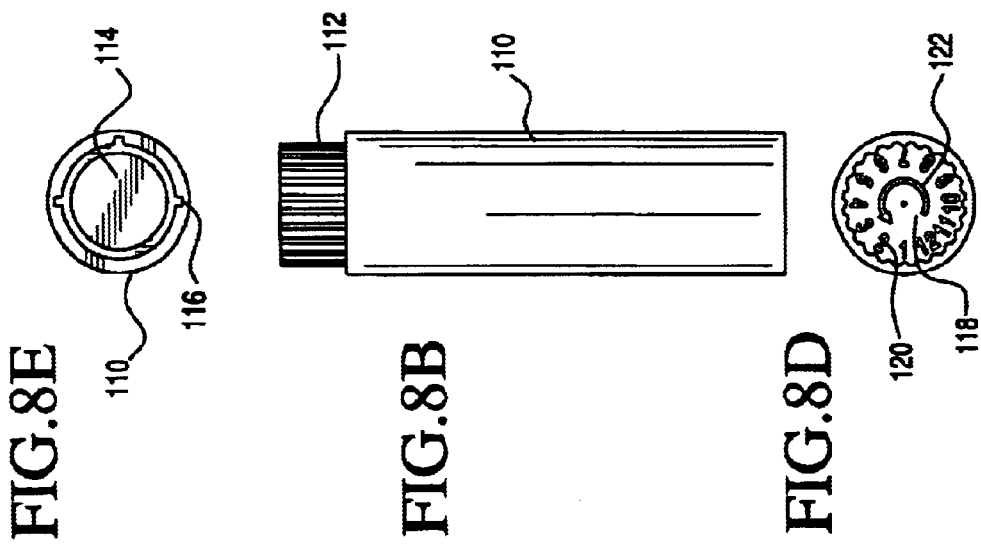
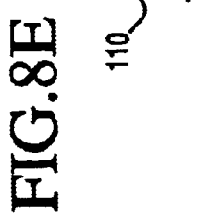

PRESSURE SEQUENCE CONTROLLED VALVE AND SPRINKLER SYSTEM USING SAME

RELATED APPLICATION

This application claims the benefit of U.S. Provisional Application No. 60/203,821, filed May 12, 2000. The disclosure of U.S. Provisional Application No. 60/203,821 is incorporated herein by reference.

FIELD OF THE INVENTION

The present invention relates to an adjustable pressure sequence controlled (PSC) valve and sprinkler system using said valves and, more particularly, to pressure sequence controlled valves and sprinkler system for watering a lawn or other grass area, garden or other environment requiring a periodic supply of water or other liquid substance.

BACKGROUND OF THE INVENTION

Remote activation of sprinkler valves and heads by turning pressure on/off in a common supply line has been the focus of many prior patents. However its use has been limited to cycling valves in large commercial irrigation systems in which its purpose is to limit the number of heads operating at any one time in order to overcome flow limitations.

U.S. Pat. No. 2,793,908 discloses sequentially opening valves along feeder supply lines in order to reduce the diameter (size) of pipe needed. Only one or two heads on feeder lines operate at any one time, thereby reducing the flow of water. U.S. Pat. No. 3,147,770 and U.S. Pat. No. 4,116,216 disclose restricting the number of heads open at any one time by controlling the flow to branches of heads, with only one branch operating at a time.

However, these and other references and existing devices do not consider varying the duration of phases of operation or providing valves that cycle through phases in a convenient and efficient manner. The references also do not consider the varying requirements that exist among different environments. For example, orchards and golf courses are homogeneous and require equal amounts of water everywhere. Residences and non-homogeneous growing areas, such as nurseries and parks, need different amounts of water in different areas.

OBJECTS OF THE INVENTION

It is therefore an object of the present invention to provide a valve and sprinkler system with advantageous features that do not exist in current devices.

It is another object of the invention to provide a valve that is mechanically/hydraulically operated.

It is a further object of the invention to provide a sprinkler system that can be installed in a manner more conveniently, efficiently and with less cost as compared to existing sprinkler systems.

It is an additional object of the invention to provide an adjustable sprinkler system that uses a common supply line for all of the installed valves.

It is yet another object of the invention to provide a sprinkler system that can be easily laid out and installed.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, a lawn sprinkler system is provided that includes a master controller whose input is coupled to a water supply and whose output is coupled via pipe to a number of valves. The master controller is preprogrammed to supply water for a number of phases of operation, where the operation advances to a subsequent phase upon turning the supply of water off for a relatively short amount of time followed by turning the supply of water back on. Each of the valves includes an in-port and an out-port, where each valve cycles through each of the phases as controlled by the master controller. Also, each valve is pre-set (manually set at valve) to supply water to its respective out-port during a selected phase of operation.

As an aspect of the present invention, one or more sprinkler heads are attached to each valve.

As another aspect of the present invention, each valve includes a housing with an inner chamber and a piston disposed within the housing's chamber. The piston includes a sealing disk that divides the chamber into separate top and bottom chambers, and the sealing disk moves up and down from within the chamber based upon the force of pressure exerted on it as a result of the supply of water from the master controller. The piston also rotates within the chamber when it descends to a certain position within the chamber and rotates further when it rises to another position. The sealing disk includes a port hole that supplies water from within the bottom chamber of the housing to the valve's out-port when the port hole is at the same angular position as the out-port.

As a feature of this aspect, the piston includes a circular set of top teeth disposed on the top surface of the sealing disk and a circular set of bottom teeth disposed on the bottom surface of the sealing disk. The housing includes a circular set of bottom teeth disposed on its bottom surface below the piston's bottom teeth, and the housing also includes a circular set of top teeth disposed on its top portion above the piston's top teeth. The housing's top teeth and the piston's top teeth collectively rotate the piston by half a phase, and the housing's bottom teeth and the piston's bottom teeth collectively rotate the piston by half a phase.

As a further aspect of the present invention, the valve includes an indicator that identifies the number of phases until the valve activates.

As yet another aspect of the present invention, the valve can be designed to supply water during two phases of operation.

In accordance with a particular embodiment of the pressure sequence controlled valve of the present invention, the valve includes a housing with a chamber, where the housing includes an in-port for receiving a source of liquid into the chamber, and an out-port for supplying liquid out from the chamber. The valve further includes a piston disposed within the chamber of the housing, and the piston includes a sealing disk that divides the chamber into separate top and bottom chambers. The sealing disk has a top surface that defines a surface of the top chamber and a bottom surface that defines a surface of the bottom chamber. The in-port of the housing is coupled to the bottom chamber, and the out-port of the housing is disposed above the sealing disk. The piston moves up and down within the chamber in accordance with pressure on the piston. The piston rotates within the chamber a first predetermined distance when the piston rises to a predetermined first position, and the piston rotates a second predetermined distance when the piston descends to a predetermined second position. The sealing disk includes a port hole that extends between the top and bottom surfaces of the sealing disk and has substantially the same size as the out-port of the housing. The sealing disk's port hole supplies liquid within the bottom chamber of the housing to the out-port when the port hole is at an angular position that is in coincidence with the out-port.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which:

FIGS. 5a–5d are various views of the valve's piston in accordance with the present invention;

FIGS. 7a–7e are various views of the valve's top housing in accordance with the present invention;

FIGS. 8a–8e are various views of the valve's indicator in accordance with the present invention;

DETAILED DESCRIPTION OF THE INVENTION

The present invention is directed to a novel valve and a sprinkler system using the novel valves along with a programmable master controller valve and sprinkler heads coupled to those valves, as herein described. As discussed below, water pressure is used to mechanically/hydraulically operate the valves of the present invention. Individual valves are "programmed" (i.e., manually turned/set) to operate at respectively different, selected sequences of pulses. In accordance with a preferred embodiment of the present invention, the sprinkler system includes a plural number of identically designed valves that are each pre-programmed (manually set) to operate (i.e., supply water) during different phases of operation of the sprinkler system of the present invention. As further discussed below, the sprinkler system includes a master controller valve (also called master controller, controller/timer and the like) disposed at a water source. The master controller is designed to provide water during different "phases," where the master controller cycles from one phase to a subsequent phase by turning off the flow of water for a short period of time, followed by allowing the water to flow. As will be appreciated from the following discussion, each phase of the system is a duration of time (e.g., 30 minutes) during which water under pressure is allowed to enter the common supply line, constituting a single phase of operation, where the sprinkler system cycles through its various phases by repeated cycles of turning water pressure off then back on, where only a single master controller valve is utilized to control the operation of the entire sprinkler system of the present invention.

Figure 1:
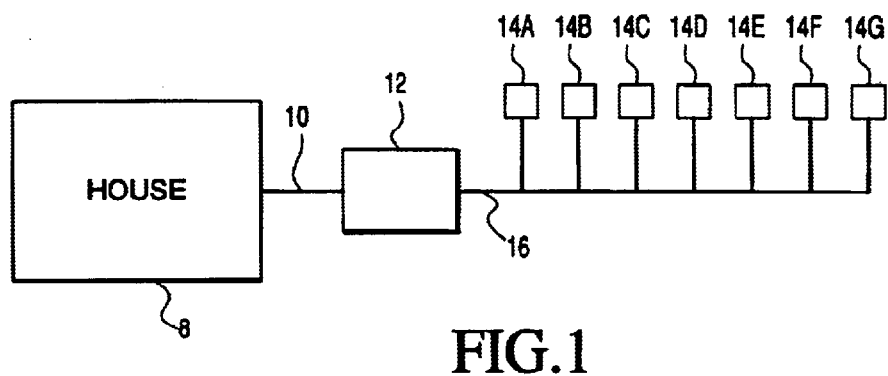
FIG. 1 is an exemplary block diagram of the sprinkler system of the present invention.

Referring now to the drawings, FIG. 1 is a basic block diagram showing the sprinkler system of the present invention connected to a water source of a residential home. Of course, the sprinkler system can be utilized in any'suitable setting, such as business, commercial, industrial, etc. For convenience herein, the present invention will be described in the context of a lawn sprinkler system for use with a residential home.

Figure 2:
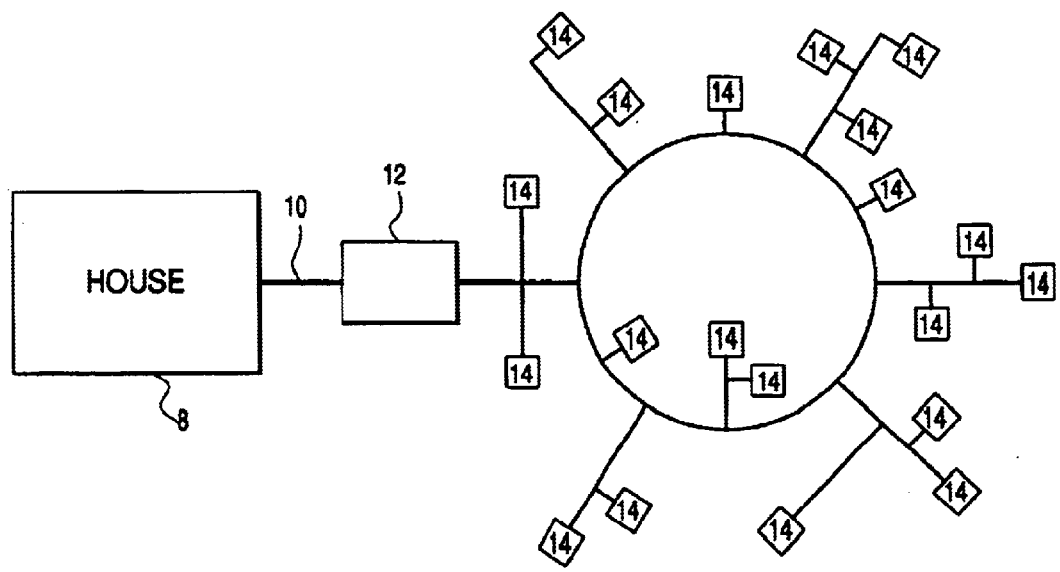
FIG. 2 is another exemplary block diagram of another arrangement of the sprinkler system of the present invention.
Figure 3A:
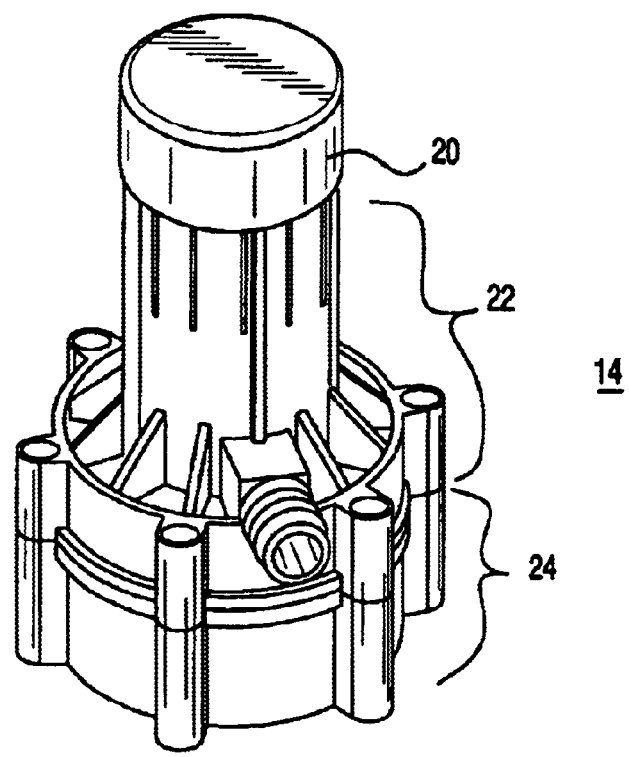
FIGS. 3a–3e are various views of the assembled valve of the present invention.
Figure 3E:
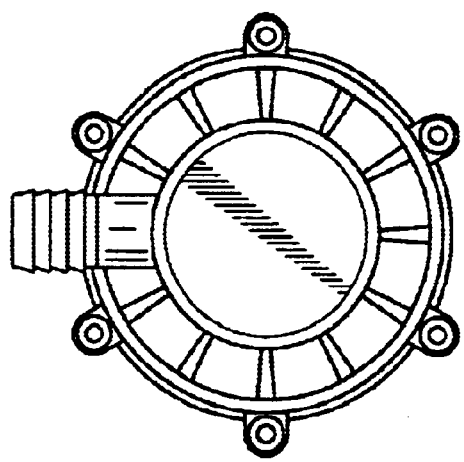
Figure 3B:
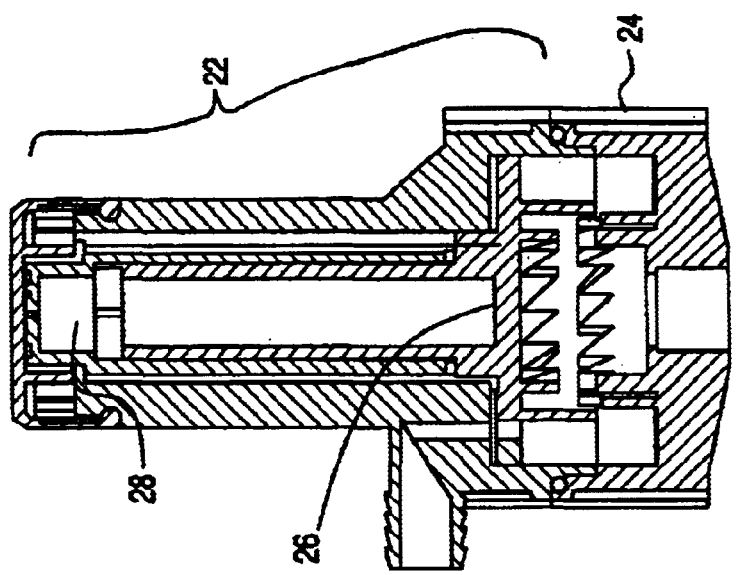
Figure 3C:
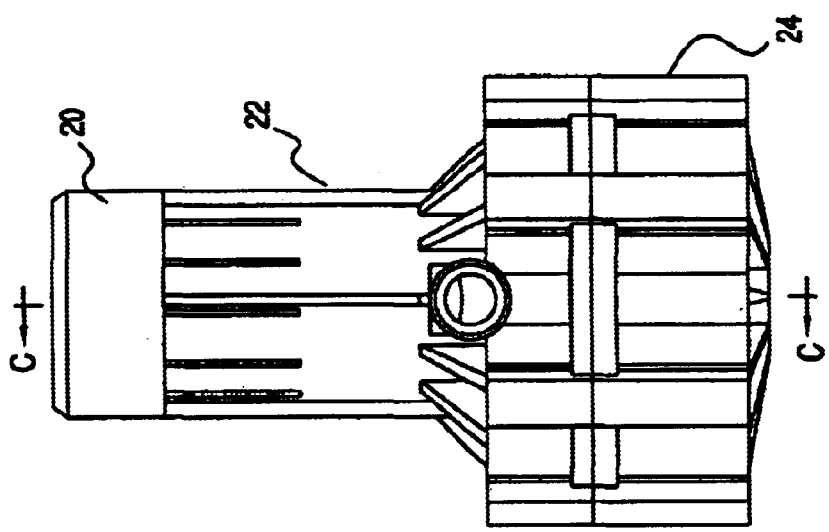
Figure 3D:
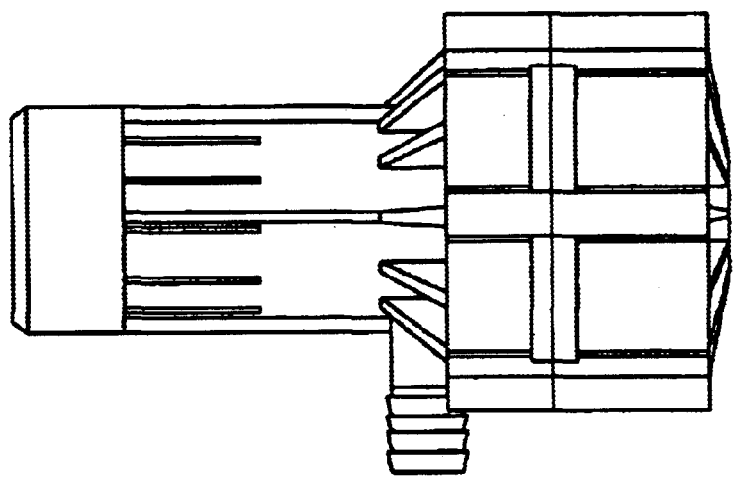

As shown in FIG. 1, a house 8 provides a source of water 10, supplied under pressure. In basic form, the sprinkler system of the present invention includes a master controller timer valve 12 (also called controller, master controller, etc.), a plural number of valves 14A–14G embodying the present invention, one or more sprinkler heads coupled via tube to each valve (sprinkler heads not shown in FIG. 1), and a common water supply line 16 coupled between controller 12 and each of the valves 14A–14G. As shown, valves 14A–14G are connected in parallel, not serially, and thus water is supplied from master controller 12 to each and every valve independent of the operation of other valves. That is, there is no need for water to transverse through one valve to be received by another. Also, it is appreciated that the illustration of FIG. 1 is provided to illustrate the operation of the present invention in functional terms and it is to be understood that the sprinkler system can include any number of valves and the particular layout (i.e., positions) of such valves can be varied as necessary. Thus, a sprinkler system embodying the present invention may include any desired number of valves (e.g., 5, 10, 25, 100, etc), with each valve being positioned at any desired location. For example, FIG. 2 schematically illustrates a particular layout that may be achieved in accordance with the present invention, with the output of master controller 12 being supplied to multiple valves 14, each in parallel connection with one another, in a particular layout necessary to properly supply water as necessary. Also, one or more sprinkler heads (not shown in FIG. 2) generally are coupled to each valve, as will be further discussed.

Returning to the operation of the sprinkler system of the present invention, Table 1 shown below illustrates an exemplary programming arrangement of the seven (7) valves 14A–14G shown in FIG. 1. As indicated in Table 1, valve 14A is programmed to operate (i.e., supply water) during phase 1, valves 14B and 14C are programmed to supply water during phase 2, and so on.

TABLE 1

| Valve | Phase of Operation |
|---|---|
| 14A | 1 |
| 14B | 2 |
| 14C | 6 |
| 14D | 3 |
| 14E | 4 |
| 14F | 5 |
| 14G | 2 |

As previously mentioned, each continuous supply of water by master controller 12 constitutes a single phase of operation, with the next phase beginning upon discontinuing the flow of water for a relatively short period of time (e.g., 10 seconds) followed by turning on the flow of water. Thus, in the illustrative example, the sprinkler system of the present invention operates to provide water to seven (7) different geographic zones or areas, with sprinkler heads coupled to the output of valves supplying water to respectively different zones or phases determined by length of watering needed. In the example provided, phase 1 opens valve 14A and supplied water to zone A; phase 2 opens valves 14B and 14G and supplies water to sprinklers covering both zones B and G respectively. Since valves 14B and 14G are programmed (i.e., manually set) to supply water during the same phase 2, then zones B and G are supplied with water during the same phase. As would be appreciated to one of ordinary skill in the art, typical sprinkler heads require water to be supplied under pressure to normally operate. If, however, too many sprinkler heads are operating at the same time, then the water pressure in the supply line would be reduced accordingly which, in turn, may cause those sprinkler heads to not operate effectively.

Referring back to Table 1, valves 14B and 14G are programmed to operate during the same phase of operation since it has been determined that all of the sprinkler heads attached to valves 14B and 14C can properly operate together and have similar needs for length of watering. For the sprinkler heads attached to the other valves, water is supplied to only one set of sprinkler heads at a time (i.e., during a particular phase). As will be understood from the following discussion, the present invention utilizes these concepts and provides a system that is convenient and efficient to install and operate, and in a manner not previously contemplated.

Table 2 shown below illustrates another exemplary arrangement of the sprinkler system of the present invention. In the given example, there are 26 valves 14A–14Z and each valve has a single sprinkler head attached so that one sprinkler head is supplying water to, for example, a grass area when one valve is "on" (i.e., supplying water to the connected head), two sprinkler heads supply water to grass areas when two valves are on, etc. As indicated in table 2, valves 14A–14C operate during phase 1, valves 14D and 14E operate during phase 2, valves 14F and 14G operate during phase 3, valve 14H operates during phase 4, valves 14I–14L operate during phase 5, and so on.

As would be appreciated, water pressure is greatest when only a single valve is operating, which is the case during phases 4, 6, 7 and 10, during which valves 14H, 14M, 14N and 14U, respectively, are operating. For those phases during which multiple valves are operating, water pressure being supplied is accordingly reduced. Phases with only one head operating at a time would normally bet set to run a sprinkler head with a high volume flow (i.e., oscillating head), while phases that operate many heads at once would be used to control low volume flow heads (i.e., small pop-ups).

TABLE 2

| Valve | Phase of Operation |
|---|---|
| 14A | 1 |
| 14B | 1 |
| 14C | 1 |
| 14D | 2 |
| 14E | 2 |
| 14F | 3 |

TABLE 2-continued

| Valve | Phase of Operation |
|---|---|
| 14G | 3 |
| 14H | 4 |
| 14I | 5 |
| 14J | 5 |
| 14K | 5 |
| 14L | 5 |
| 14M | 6 |
| 14N | 7 |
| 14O | 8 |
| 14P | 8 |
| 14Q | 9 |
| 14R | 9 |
| 14S | 9 |
| 14T | 9 |
| 14U | 10 |
| 14V | 11 |
| 14W | 11 |
| 14X | 12 |
| 14Y | 12 |
| 14Z | 12 |

Figure 4:
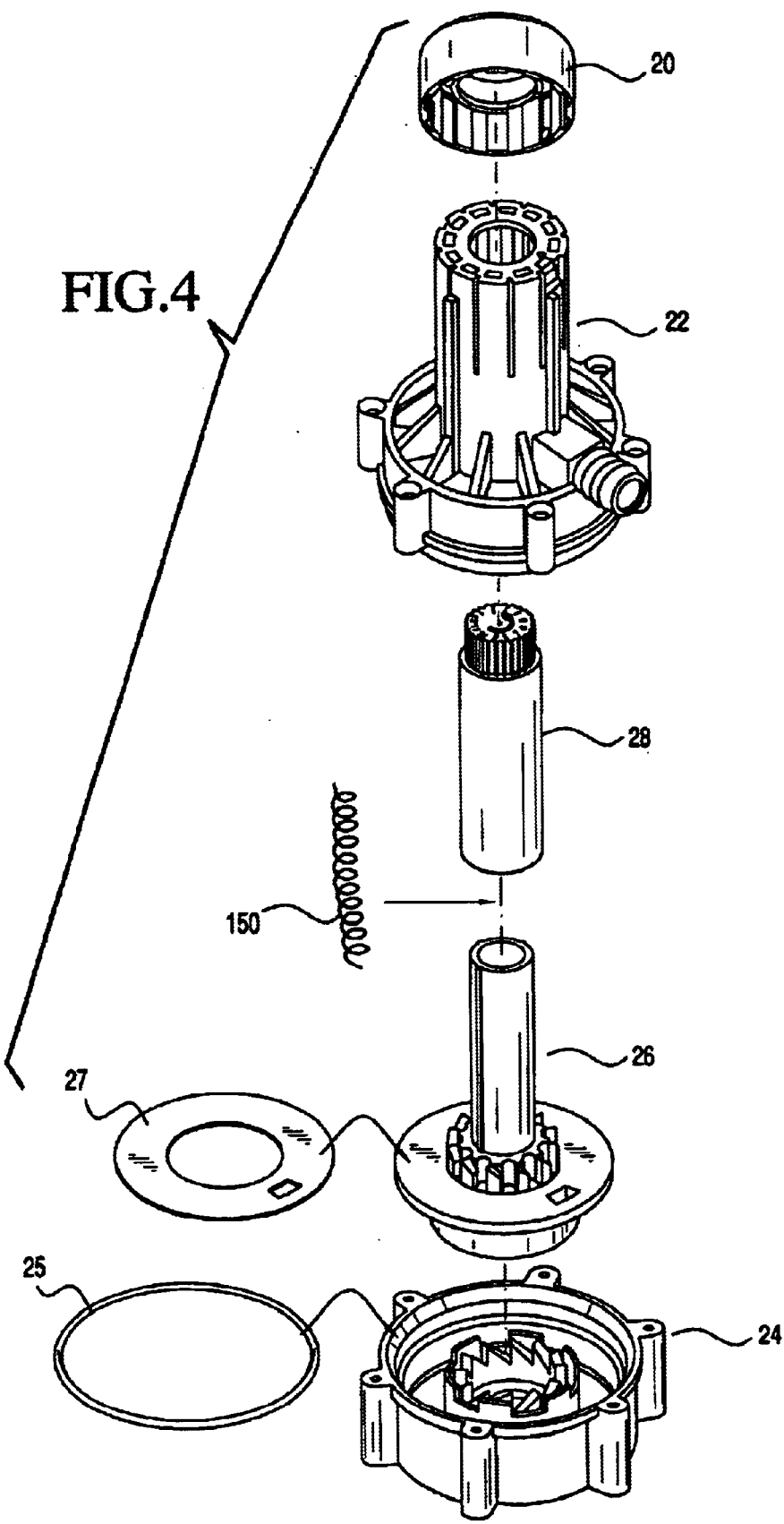
FIG. 4 is an exploded view of the valve of the present invention.

Turning now to the design of the valve of the present invention, FIGS. 3a–3e show various views of the valve 14. The principle components of valve 14 include a cap 20, a top housing 22, a bottom housing 24, a piston 26 and an indicator 28 (piston 26 and indicator 28 shown in the phantom view of FIG. 3B). FIG. 4 is an exploded view of the valve of the present invention. Piston 26, a spring 150 and indicator 28 are disposed between top housing 22 and bottom housing 24, and cover 20 is disposed on the top of the assembly. Also, the valve includes an o-ring 25 and a gasket 27. Each of these components is further discussed below.

FIGS. 5a–5d schematically illustrate different views of piston 26 of the present invention. FIG. 5a is a perspective view, FIG. 5b is a side view showing an upper set of teeth 30, FIG. 5c is another side view shown in phantom and revealing a lower or bottom set of teeth 50, and FIG. 5d is a top view of the piston. Piston 26 includes upper teeth 30, a stem 32, three alignment slots 34, a sealing disk 40, a compression sleeve 42, and a set of bottom teeth 50. A port hole 38 is disposed in sealing disk 40 which, as described below, allows water disposed below sealing disk 40 to travel through the disk to enable the operation of the valve of the present invention.

Figure 6C:
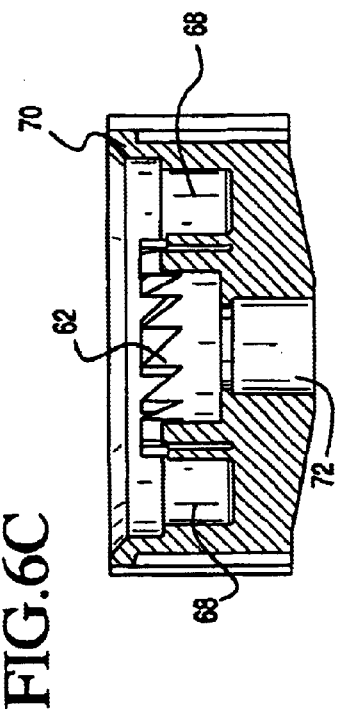
FIGS. 6a–6d are various views of the valve's bottom housing in accordance with the present invention.
Figure 6A:
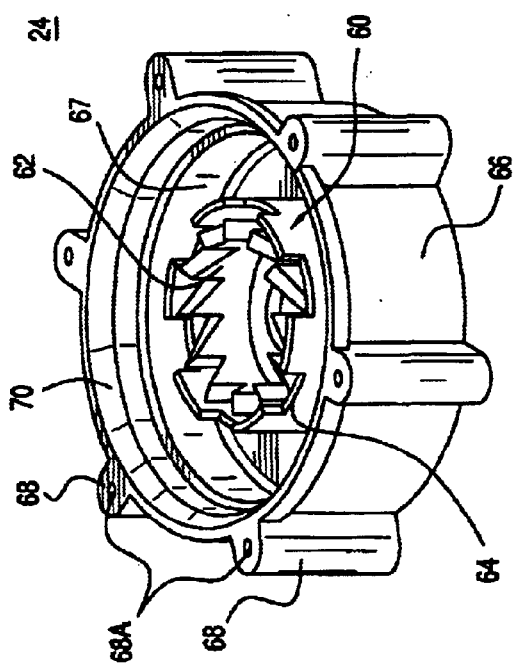
Figure 6B:
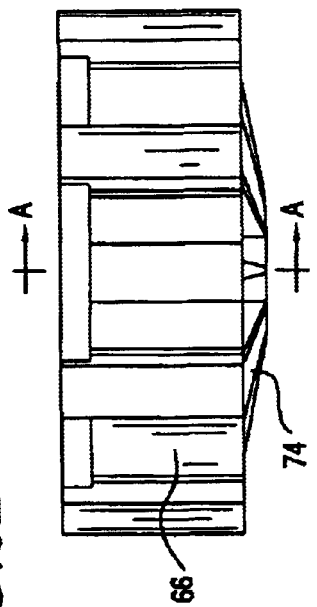
Figure 6D:
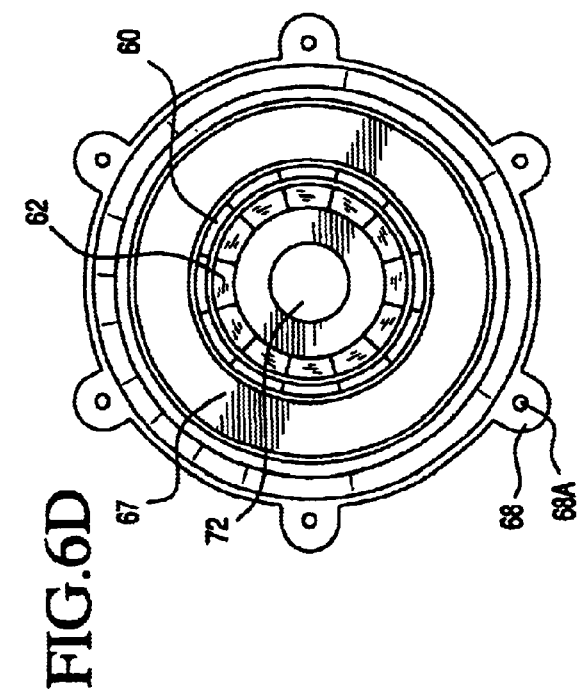

As shown in the exploded view of FIG. 4, piston 26 is disposed between bottom housing 24 and top housing 22 (along with indicator 28 and spring 150). Bottom housing 24 is shown in FIGS. 6a–6d. FIG. 6a is a perspective view showing a set of timing teeth 62, FIG. 6b is a side view, FIG. 6c is another side view shown in phantom and showing a threaded water in-port 72, and FIG. 6d is a top view. Bottom housing 24 includes timing teeth 62 circularly disposed around one end of in-port 72. Bottom housing 24 also includes an outer support wall 66, an inner wall 67, a set of screw turrets 68, a beveled O-ring wall 70, and, as previously mentioned, a threaded in-port 72.

The bottom housing 24 further optionally includes a circular compression sleeve 60 having a set of rectangular shaped notches 64. The compression sleeve is sized to be disposed concentric to and around the circular set of teeth 62. As will be further discussed, compression sleeve 60 is provided to ensure pressure build up under the piston within the valve when plural valves are activated simultaneously (which works in conjunction with compression sleeve 42 of the piston). Bottom housing 24 also includes a set of inner support ribs 74 disposed in its outer support wall to provide additional support and strength to the housing. However, support ribs 74 may be removed or not utilized if the housing is constructed from a sufficiently strong material, as would be known in the art.

FIGS. 7a–7e are various views of top housing 22 of the present invention. FIG. 7a is perspective view showing a pressure release chamber housing 84 disposed above the housing's outer support wall 82 and a water out-port 80, FIG. 7b is a side view, FIG. 7c is another side view shown in phantom and revealing water out-port chamber 80A and a port hole 96 that extends into chamber 80A, FIG. 7d is a top view, and FIG. 7e is a bottom view and which reveals a circular set of slotted timing teeth 88 and one end of port-hole 96.

Top housing 22 includes an outer support wall 82 disposed at its lower end on top of which is disposed pressure release chamber housing 84. Outer support wall 82 is circular and defines an internal lower chamber 83. Pressure release chamber housing 84 is circular in shape and defines an inner pressure release chamber 86. Chamber 86 extends from the lower chamber 83 at one end to the top of top housing 22 at its other end. Housing 84 includes a top surface 85 which has a set of venting ports 98. Housing 84 further includes a set of venting channels 100 which extend down the housing, cap support ribs 102, and a set of L-channels 104 snap to lock cap on the housing. A set of support ribs 90 are disposed between the lower chamber support wall 82 and the pressure release chamber housing 84, and operate to provide additional strength to the device, but may be removed or not used if sufficiently strong materials are used to manufacture the top housing. Top housing 22 also includes a set of screw turrets 92 disposed around its lower chamber. Port hole 96 (shown in FIGS. 7c and 7e) connects out-port chamber 80A to lower chamber 83.

FIGS. 8a–8e show different views of indicator 28 of the present invention. FIG. 8a is a perspective view, FIG. 8b is a side view, FIG. 8c is another side view shown in phantom, FIG. 8d is a top view, and FIG. 8e is a bottom view. Indicator 28 includes a bottom housing 110, cylindrical in shape, and a top housing 112 also cylindrical in shape having a closed top surface 118 which also serves as the face of the indicator. The top and bottom housings of the indicator are concentric and sized to be installed over stem 32 of piston 26, such as shown in FIG. 4. Bottom housing 110 has an open interior 114 (also called inner chamber 114) into which the piston's stem 32 is inserted during the valve's assembly. Indicator face 118 includes a set of phase numbers 120, such phase numbers 1–12 as shown in FIGS. 8a and 8d being representative of the number of phases through which the valve of the present invention cycles in the presently discussed embodiment. Of course, the valve of the present invention may be designed to cycle through a different number of phases, as will be further discussed below. The indicator's bottom housing includes on its interior surface a set of channels 116 (three shown in the present embodiment). Channels 116 receive alignment slots 34 that are disposed on the piston's stem 32 (FIG. 5a), so that the rotational (i.e., angular) position of indicator 28 is aligned with the piston's angular position. Thus, indicator 28 rotates as piston 26 rotates. An arrow 122, shown in FIGS. 8a and 8d, is provided on indicator face 118 and shows the user the direction to manually turn the indicator to set the phase number on which it will open/operate.

Figure 9A:
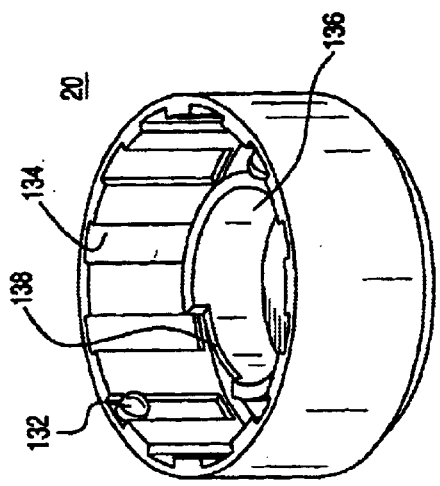
FIGS. 9a–9d are various views of the valve's cap in accordance with the present invention.
Figure 9C:
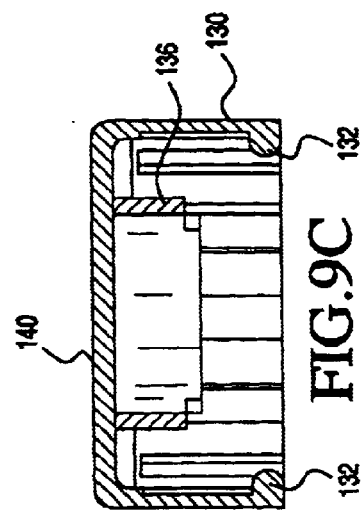
Figure 9D:
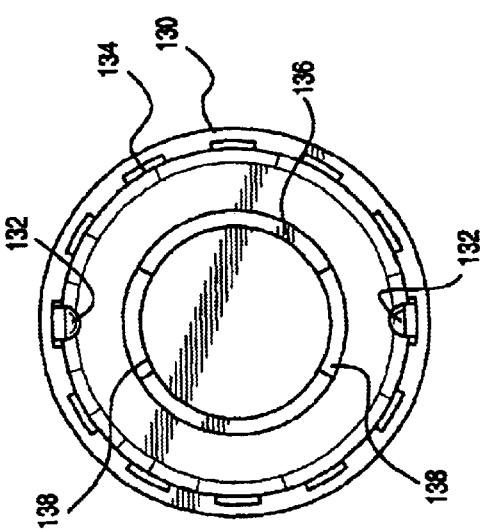
Figure 9B:
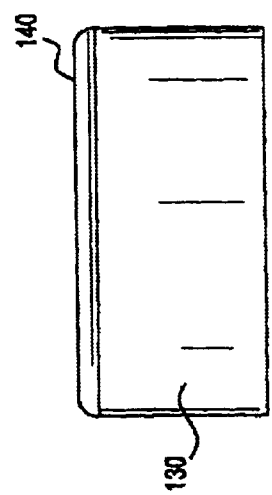

FIGS. 9a–9d are various views of the valve's cap 20. FIG. 9a is a perspective view, FIG. 9b is a side view, FIG. 9c is another side view shown in phantom, and FIG. 9d is a bottom view. Cap 20 includes a housing 130, and the inner surface of housing 130 includes a set of venting channels 134 and a pair of lock knobs 132 disposed on and extending inward from opposing venting channels. As further discussed below, venting channels 134 assist in releasing pressure from within the valve during the valve's operation. Cap 20 also includes an inner support ring 36 that extends from the inner surface of the cap's top 140, and a pair of slots 138 are provided in the support ring.

Referring back to the exploded view of the valve shown in FIG. 4, piston 26 is disposed on bottom housing 24. The piston's bottom teeth 50 (FIG. 5c) are aligned and sized to rest on top of the bottom housing's timing teeth 62 (FIG. 6a), with both sets of timing teeth 50 (on the piston) and 62 (on the bottom housing) having teeth that are pitched at 45 degree angles and, in the present exemplary embodiment, each set is comprised of twelve (12) teeth which establishes twelve (12) phases through which the valve cycles. The angular position of piston 26 with respect to the top housing's angular position identifies the phase in which the valve is currently operating.

As previously described, piston stem 32 (FIG. 5a) is disposed within housing 110 of indicator 28 (FIG. 8a). As shown in FIG. 4, spring 150 is disposed within the piston's spring chamber 36 (FIGS. 5a, 5c) so that the spring at one end is biased against the inner surface of indicator face 118 of indicator 28 (FIGS. 8a, 8c), and at its other end is biased against the bottom floor of the piston's spring chamber 36. As discussed further below, spring 150 serves two functions, it maintains the indicator's face 118 in a raised position, and it assists in the lowering of the piston during the cycling between phases.

Again referring to FIG. 4, top housing 22 is disposed on bottom housing 24, with the piston's stem 32 along with indicator 28 being disposed within the top housing's pressure release chamber 86 (FIGS. 7a, 7c). Lower outer support wall 82 of top housing 22 (FIGS. 7a, 7b) is sufficiently deep (i.e., sufficiently high) so that the lower chamber 83 of the top housing is sufficiently high to provide a gap between the sealing disk's top surface 40a of the piston (FIG. 5a) and the top of the top housing's lower chamber 83 (FIG. 7c). Similarly, a gap of the same length exists between upper teeth 30 of piston 26 (FIGS. 5a, 5b) and timing teeth 88 of top housing 22 (FIG. 7c).

When water is supplied to the valve via water in-port 72 (FIG. 6c), the water is forced against the piston's bottom surface, forcing it to rise within the valve's inner chamber. As the piston rises, its upper teeth 30 (FIG. 5a) come into contact with the top housing's teeth 88 (FIG. 7c), but the two sets of teeth are mis-aligned by half a phase upon contact, so that the piston is forced to rotate one half of phase as it continues to rise.

In accordance with the present invention, the angular position of the piston when the opposing sets of teeth above the piston's sealing disk 40 (i.e., the piston's upper teeth 30 and the top housing's teeth 88) are aligned is offset by one half of a phase from the piston's angular position when the opposing sets of teeth disposed below the piston's sealing disk 40 (i.e., the piston's bottom teeth 50 and the bottom housing's teeth 62) are aligned. Thus, piston 26 rotates one half of a phase when it rises from its lower most position within the valve's top and bottom housings to its upper most position. Likewise, the piston rotates a half of a phase in the same direction when it moves from its upper most position to its lower most position, which occurs upon release of water pressure from within the valve, as further discussed below. The piston therefore rotates one complete phase upon the release of water pressure (from the underside of the piston), followed by the reoccurrence or re-supply of water to the valve. Indicator 28 is disposed on piston stem 32 and the piston's alignment slots 34 within the indicator's inner channels 116 (FIG. 8*c*) cause the indicator to rotate with the piston.

As shown in the drawings, the slotted teeth prevents wear on the seal/gasket 27 (FIG. 4) since there is no rotation at the point of contract between the top of the sealing disk and the lower surface of the top housing. Moreover, the slots allow for various thicknesses of the gasket to be utilized without impacting the timing/rotation of the present invention.

When the valve of the present invention is assembled, as previously discussed, the top and bottom housings are secured using turrets 68 of the bottom housing (FIG. 6*a*) and turrets 92 of the top housing (FIG. 7*a*). The turrets are aligned and secured by providing suitable screws or bolts (not shown) through the respective holes 92*a* and 68*a* to seal the valve. In a preferred embodiment, a rubber gasket 27 (FIG. 4) is disposed between the adjoining surfaces of the top and bottom housings to ensure a proper seal and that there is no leakage of water from within the valve during operation.

When assembled, indicator top housing 112 (FIG. 8*a*) extends through the round opening 97 of the top surface 85 of the top housing (FIG. 7*a*). The bias of spring 150 against the indicator maintains the indicator in the raised position above the top housing, even when the piston is lowered between cycles.

The flow of water through the valve will now be described with reference to FIGS. 5*a*, 7*c* and 7*e*. Water flows through the valve only during the phase when the piston's port hole 38 (FIG. 5*a*) is aligned immediately below the top housing's port hole 96 (FIGS. 7*c*, 7*e*). As previously discussed, when water is supplied to the bottom housing's in-port 72, piston 26 is forced upwards against the top housing. If the piston's port hole 38 and the top housing's port hole 96 align during this phase of the valve, water below the piston's sealing disk 40 passes through the piston's port hole and into the top housing's port hole 96, and then into the adjoining out-port chamber 80*a*, and finally out from the valve. Generally, a pipe is attached between out-port 80 and one or more sprinkler heads, so that water being output from the valve is supplied to those attached sprinkler heads.

As previously discussed, as water pressure is reduced (i.e., the master control discontinues water pressure), piston 26 is pushed downward by the spring towards bottom housing 24. The piston's lower teeth 50 make contact with the bottom housing's teeth 62 (angularly offset by half a phase, as previously discussed), forcing the piston to rotate upon interconnection of the teeth. The piston rotates half a phase (e.g., 15 degrees in a 12 phase device). Water pressure returns (i.e., by control of the master controller re-supplying water), and the piston is forced upward and against the top housing. The teeth above the piston's sealing disk interconnect, forcing the piston to rotate another half a phase in the same direction. At this point, the valve has cycled to the next phase. If the piston's port hole 38 is not aligned with the top housing's port hole 96 in the newly entered phase, water can not flow through the valve's out-port 80. Valve 14 of the present invention cycles through each of the twelve phases (in the present embodiment), but supplies water only during one phase. The phases are then repeated.

Referring back to FIGS. 7*a* and 7*d*, the top housing includes a timing mark 106 on its top surface. Timing mark 106 lines up with one of the numbers on the indicator's face 118 (FIG. 8*a*) which identifies the number of phases remaining until the valve opens (which also can be said to be the current phase of the respective valve). As would be appreciated, the current phase of the valve is determined from the relative position of the piston's port hole 38 from the top housing's port hole 96. In one embodiment of the present invention, different valves embodying the present invention can be designed to supply water during different phases. Namely, a set of valves can be designed to supply water during phase 1, another set of valves can be designed to supply water during phase 2, etc. Generally, this is easily accomplished by modifying the indicator's face 118 to provide phase numbers in the desired locations. Then, a particular valve can identify in which phase it supplies water by some convenient indication, such as by encircling the particular phase number (or providing that phase number in a different color) on the indicator. In any case, the user, whether consumer, installer, etc., is easily able to identify the particular phase in which the valve supplies water.

The preferred variation, however, is to provide the phase numbers on the indicator accordingly so that all valves supply water during phase 1, as indicated on the indicator. With the method of providing identical valves for an entire sprinkler system, pre-selection of particular valves is unnecessary, and use of such identical valves is further discussed below.

Cap 20 is installed on top of the assembly but is removable to reveal the indicator's face. The cap's lock knobs 132 (FIG. 9*a*) slide into the top housing's L channels 104 to hold the cap onto the top housing. The indicator's top housing 112 then is retained within the cap's inner support ring 136, and the cap's slots 138 of the inner support ring are provided to allow for a gap for the timing mark on the top housing.

During installation of the lawn sprinkler system of the present invention, the number of zones that will be needed to "cover" the lawn is determined. Then, the positions and types of sprinkler heads are determined in a manner well known in the art. Pipe is installed to interconnect all of the identified positions, and the interconnected pipes are coupled to a common supply line. Valves with adequate number of phase are installed between the common supply line and each sprinkler head, and/or each group of sprinkler heads that have similar operating time requirements and, preferably, that are in relatively close proximity with one another. Finally, a master control valve is installed between the common supply line and the source of water. Master control valve 12, shown in FIGS. 1 and 2, then operates to supply water during each of the predetermined number of phases (e.g., 12) of the installed valves, with the master control valve controlling the length of each phase. After installation is complete, each valve is manually set to begin in an appropriate phase (further discussed below). Generally, the sprinkler system is operated through a complete cycle of phases to determine whether sufficient water pressure is provided to the sprinkler heads that are operating. If it is determined that there is insufficient water pressure to one or more sprinkler heads, then the sprinkler heads are regrouped to reduce the flow requirements (e.g., set to operate on different phases or on an unused phase).

Figure 10:
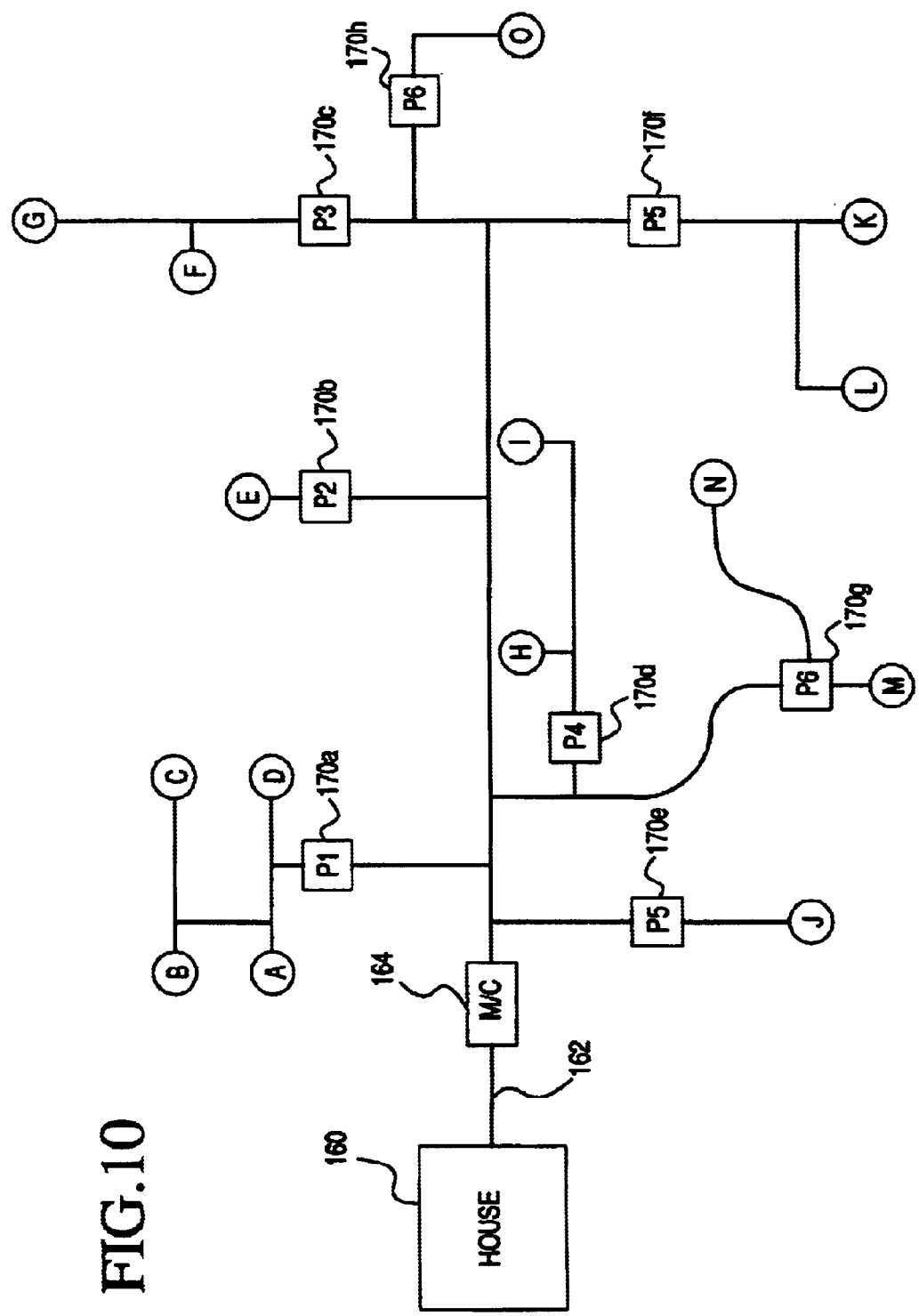
FIG. 10 is a block diagram of an exemplary format of the sprinkler system of the present invention showing phases of operation of the inventive valves.

FIG. 10 is an exemplary lawn sprinkler layout using the lawn sprinkler system in accordance with the present invention. A house 160 has a water supply line 162 coupled to a master controller (M/C) 164 that functions to operate in the manner previously discussed. In the exemplary lawn sprinkler system shown in FIG. 10, master controller 164 is programmed to cycle through 6 phases one time per day or several times per day, beginning at, for example, 6:00 a.m., with each phase being thirty (30) minutes in length, with five (5) minutes of "off" time between each phase. Thus, one complete cycle lasts 205 minutes, comprising six 30 minute phases (for a total of 180 minutes), and five 5 minute "off" intervals between each phase change (totaling 25 minutes). Of course, the length of the phases can be different (e.g., 15 minutes, 60 minutes, etc.), the length of each "off" time may vary, and the total number of phases may also vary (e.g., each valve may have 12 phases, 8 phases, 20 phases, etc.). Moreover, master controller 164 can be programmed to provide phase lengths having respectively different lengths of time. For example, phase 1 can operate for 30 minutes, phase 2 can operate for 45 minutes, etc. However, in the present example, master controller 164 is programmed to have 6 phases, each phase being 30 minutes long, and with 5 minute gaps (i.e., off time) between the phases.

In the sprinkler system diagram of FIG. 10, there are eight (8) valves 170a–170h that cycle through six (6) phases. Valve 170a is programmed to allow water to flow during phase 1 (represented by "P1" in FIG. 10). Valve 170b is programmed to provide water during phase 2 (P2). Valve 170c is programmed to supply water during phase 3 (P3). Valve 170d is programmed to supply water during phase 4 (P4). Valves 170e and 170f are programmed to operate during the same phase 5 (P5). And valves 170g and 170h are programmed to supply water during phase 6 (P6).

Programming of the valves may be carried out in various ways, based on the valves design. Selection of valves that identify in which phase they supply water may be selected. Thus, valve 170b would include some sort of indication on its indicator face 118, such as providing a circle around phase number 2. The other valves may also be selected in this manner. Then, each valve is set to initially begin in phase 1. However, this variation of identifying in which phase a valve supplies water requires pre-selection of valves that operate during respectively different phases. In a more preferred embodiment of the present invention, all the valves are designed to supply water during phase 1, as previously mentioned. Then, during installation of the lawn sprinkler system of the present invention, the current phase of operation of each valve may be preset so that its "on" time is at the correct phase of the master controller. In such embodiment, the valves may be preset to the phases as indicated in table 3 shown below.

TABLE 3

| Valve | Desired "on" phase of master controller | Valve is pre-set to: |
|---|---|---|
| 170a | Phase 1 | Phase 1 |
| 170b | Phase 2 | Phase 2 |
| 170c | Phase 3 | Phase 3 |
| 170d | Phase 4 | Phase 4 |
| 170e | Phase 5 | Phase 5 |
| 170f | Phase 5 | Phase 5 |
| 170g | Phase 6 | Phase 6 |
| 170h | Phase 6 | Phase 6 |

As shown in table 3, valve 170a is preset to phase 1 so that it turns "on" upon supply of water by master controller 164, at which point master controller 164 is operating in its first phase. The remaining valves 170b–170h are "off" since they are not currently operating in phase 1. When master controller 164 cycles to the next phase, that is, phase 2, by turning the water supply off for five (5) minutes and then back on, all of the valves advance to the next phase so that valve 170b, previously in phase 2 advances to phase 1, and hence turns on. At this point, the other valves 170a and 170c–170h are off since they are not operating in (their own) phase 1. In this instance, valve 170a is operating in its phase 6, valve 170c is operating in its phase 2, valve 170d is operating in its phase 3, valves 170e and 170f are operating in phase 4, and valves 170g and 170h are operating in phase 5. Then, when master controller 164 cycles to its next phase, i.e., phase 3, valve 170b cycles to phase 6 and is thus is off, and valve 170c cycles from phase 2 to phase 1 and turns on. The other valves cycle to subsequent phases accordingly. Actually, valves cycle to a preceding stage so that the current phase of a valve also identifies the number of phases that must be cycled through before the valve turns on. As seen from Table 3 and the discussion herein, it is possible to set any number of valves to operate in any one of the possible phases simply by manually presetting the valves to an appropriate phase.

As can be appreciated from the discussion herein, the "current" phase of operation of a valve identifies the phase of operation in which it supplies water. That is, a valve manually set to phase 2 will supply water during the 2nd phase. The manually setting of each valve is carried out by turning indicator 28 counter-clockwise when there is no pressure in the system. The piston's lower teeth will then ratchet/slide against to the lower housing's teeth.

The lawn sprinkler system arrangement as shown in FIG. 10 further illustrates that multiple sprinkler heads may be coupled to the output of an individual valve of the present invention. As shown, heads A through O represent sprinkler heads of any type that are known in the art, where heads A, B, C and D are coupled to the output of valve 170a. Then, when valve 170a is on, sprinkler heads A through D supply water to the surrounding grass areas. Only a single head E is attached to the output of 170b and thus only one sprinkler head is supplying water during phase P2. Sprinkler head 170c has attached to its output two sprinkler heads F and G. Valve 170d also has two sprinkler heads H and 1 attached to its output. Valve 170e has a single head J attached to it, and valve 170f has two sprinkler heads K and L attached to it. Since both valves 170e and 170f have been preset to be on during phase 5, water is supplied to the three heads J, K and L during phase 5. Finally, valve 170g has two heads M and N connected to it and valve 170h has one head O connected to it. Thus, sprinkler heads M, N and O supply water to surrounding areas during phase 6.

As illustrated in FIG. 10, multiple sprinkler heads or group of heads may be connected to the output of a single valve embodying the present invention. Moreover, multiple valves, e.g., valves 170e and 170f, may be programmed (i.e., manually set) to supply water during the same phase. In any event, the valves of the present invention allow for a highly efficient, economical, convenient and flexible arrangement of sprinkler heads and sprinkler valves to enable such valves to be advantageously for use in any type of sprinkler system.

Master controller 164, as well as controller 12 shown in FIGS. 1 and 2, is designed to cycle through a predetermined number of phases, with water not being supplied between the phases for a relatively short period of time. Although the specific design and construction of such a master controller is not described in particular detail herein, such controllers currently exist in the marketplace. Also, such construction and design would be well within the capability of an ordinary person skilled in the art. Such a master controller simply needs to turn water on and off at predetermined times of each day, or alternating days, etc. Alternatively, the master controller can be designed to cycle through some of the phases on a given, and then cycle through the remaining phases on a subsequent day to provide for further flexibility of the sprinkler system of the present invention. For example, in using the sprinkler layout and design shown in FIG. 10, master controller 164 can be preprogrammed to cycle through phases 1, 2 and 3 on a first day, cycle through phases 4 and 5 on the next day, and then cycle to phase 6 on the following day, with this pattern repeating itself. As another example, the lawn sprinkler system of the present invention may be programmed to have different schedules on different days of the week, or different weeks, and so on.

In addition to the features and functions previously described, the valve of the present invention includes design features that fully enable piston 26 to rise when water pressure is supplied, and to fall when water is not being supplied to the valve in a proper manner under any type of circumstance. With reference again to FIGS. 5a and 5d, the piston includes slotted teeth chambers 44 to allow air and water pressure above sealing disk 44 to vent upon activation of water pressure below the sealing disk (i.e., upon flow of water at the beginning of a phase). Chambers 44 extend between teeth 30 and allow water and air pressure above sealing disk 40 to escape into the top housing's pressure release chamber housing 84, shown in FIG. 7c. There is a gap between the inner wall of pressure chamber housing 84 and the outer wall of the indicator's bottom housing 110 to allow for trapped air and water to then be vented upwards and through venting ports 98 on the top housing 22 (FIGS. 7a and 7d).

The vented air and water pressure then travels into cap 20 (FIG. 9a) and the cap's venting channels 134 along with the top housing's venting channels 100 (FIG. 7a) allow the water and air pressure to fully vent out of the valve.

In a modified design as that shown in the drawings, an additional set of venting chambers may be provided that extend from each of the chambers 44 on the piston (see FIG. 5a) to spring chamber 36 disposed within the piston's stem 32. These additional set of venting chambers along with providing an aperture in the indicator's top housing 112 (FIG. 8a) allows water and air pressure to further vent into the cap and then out from the valve via the cap's venting channels 134 and the top housing's venting channels 100.

As previously discussed, piston 26 rises upon the supply of water under pressure to the valve of the present invention. Piston compression sleeve 42 (FIG. 5a) and bottom housing compression sleeve 60 operate to prevent water from escaping from under the piston during activation of pressure so as to ensure its rise. The sprinkler system of the present invention is designed to utilize multiple valves. Thus, it is necessary that each valve operate under potentially reduced water pressure. Piston compression sleeve 42 and bottom housing compression sleeve 60 enable the piston to rise with less water pressure than without the sleeves. In conjunction with piston compression sleeve 42, the bottom housing's compression sleeve 60, shown in FIG. 6a, further reduces the amount of pressure that is needed for the piston to rise. Compression sleeve 60 includes a number of release ports 64 which allow for the release of pressure into the bottom housing chamber below the piston when the piston reaches a suitably high level within the device.

When piston 26 is forced to its highest most point within the valve, piston sealing disk 40 is sealed against the top housing, as previously discussed. In a preferred embodiment of the present invention, the sealing disk 40 has a top surface made of a suitable gasket material, such as silicone or neopreme, or other suitable material, to seal the disk so as to prevent water from reaching above the disk and into the top housing's port hole 96 (and also prevents water flowing through the vent holes in the top housing). Port hole has a width substantially between 15 and 25 degrees is preferred to ensure that water only flows between the piston's port hole 38 and the top housing's port hole 96 during a single phase.

As is clear from the foregoing discussion, the valve of the present invention as well as the sprinkler system of the present invention, has various features that are beneficial and advantageous over existing systems. Namely, the present invention allows for a simplified lawn sprinkler system design, with each valve being easily connected to a common supply line. The valves enable an installer to control attached sprinkler heads to operate (i.e., supply water) during preferred intervals of time, with a unique flexibility that allows for the system to have multiple cycles without requiring complex water design systems.

Moreover, the present invention enables users and installers to add additional sprinkler heads to an existing system simply by cutting a tee into a pipe and installing a new valve of the present invention, with additional sprinkler heads. The newly added valve can be set to operate on a phase not yet utilized or on an existing phase with low volume requirements. Thus, modification of an installed sprinkler system can be made without affecting the entire sprinkler system. The valve of the present invention thus allows for an entire layout to be separated into time phases, where each phase may be modified simply by resetting/regrouping valves of the present invention.

In addition to the above indicated flexibility, the present invention enables for the modification of the sprinkler system of the present invention by allowing for additional zones to be added easily and without impacting whatsoever the existing design. For example, if an already installed sprinkler system embodying the present invention has one or more phases of operation that are not utilized, that is, water does not flow through any valve (i.e., to any sprinkler head) during one or more phases (called "unused" phases), then a new zone is added simply by adding a valve which can be set to supply water during an unused phase. Sprinkler heads attached to the output of the newly added valve operate during a period of time when no other heads are operating.

The present invention further allows for a flexibility that requires substantially less length of pipe by avoiding duplication of separate feeder lines than otherwise is required in prior art systems. One common supply line feeds all heads.

The present invention also is advantageous in that only a single master controller is provided and may be installed in or immediately near a building or other structure. The master controller may be battery operated, as would be well know in the art, or can be electrically connected to the nearby structure's power source. Since individual PSC valves are not electrically powered, the system obviates the need to run power lines to same.

Still further, and as illustrated in FIG. 10, the master controller may be programmed to provide watering patterns that are highly flexible. For example, the system allows for phases having independent durations of time or, if preferred, the same duration. Each valve is independently and easily setable to accommodate the watering of any type of zone, and since the valves are independently controlled by the master controller (via the supplied water) and are all directly connected to the primary water supply (the output of the master controller valve), each can operate at any time (i.e., any phase) independent of all other valves and heads operating during different phases. Thus, there is no forced watering pattern (e.g., having adjacent grass zones be watered in succession). Moreover, different phases may occur on different days of the week, so that a multi-day schedule is easily accomplished without any variation of the system described herein.

The present invention enables for the reduction of water usage due to its incredible flexibility. Valves and connected sprinkler heads are independently controlled from one another and thus there is no need to provide water flow to a head any longer than is necessary, which is quite different from that in conventional sprinkler systems.

The present invention allows for the easy removal, addition or modification of any sprinkler head utilized on the system since such would have quite limited impact on the entire system. If the flow requirements of a phase are affected by a change in heads, PSC valves can be regrouped to compensate, by manually adding or subtracting the number of PSC valves operating on any phase.

If water pressure in the supply line to the master controller changes, then PSC valves can be regrouped to compensate.

The present invention, by simplifying the design, layout and installation of a water sprinkling system, as previously discussed, may be modified or "fine tuned" by adding or removing sprinkler heads from any phase, which obviates the need for detailed flow calculations that otherwise would be required prior to installation of a sprinkler system.

Figure 11:
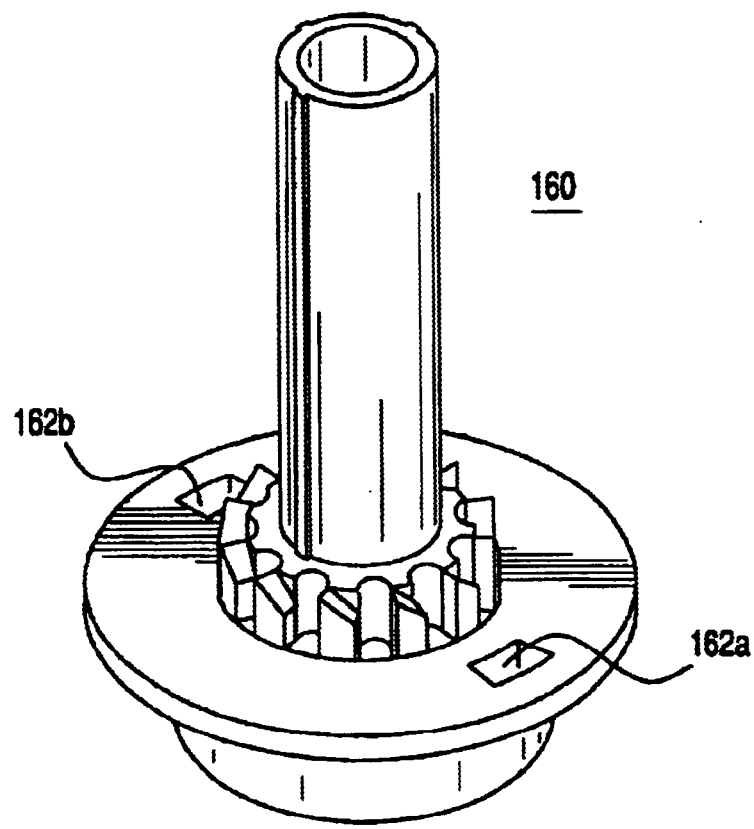
FIG. 11 is a perspective view of the valve's piston in accordance with another embodiment of the present invention.
Figure 12:
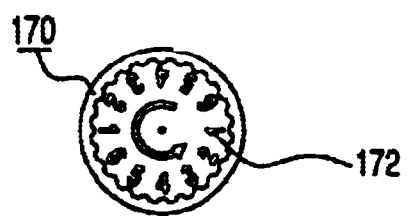
FIG. 12 is an alternative face of the indicator of the present invention.

In an alternative embodiment of the present invention, the piston may include more than one port hole so that water flows through the valve during two or more phases of operation. For example, FIG. 11 shows another piston 160 having two port holes 162a and 162b. In this modified piston, water would flow during phases 1 and 7. Along with the modified piston, the valve's indicator top face may be different, such as shown in FIG. 11. Here, the indicator's top face 170 with indicator phase numbers 172 shows phases 1–6 repeated two times, where water flows during phase 1 (i.e., both phase 1s). The operation of piston 160 shown in FIG. 11 is clear from the foregoing discussion, and all of the previously mentioned benefits and advantages of the present invention are equally applicable to the alternative piston design. Of course, more than two port holes can be provided if desired.

While the present invention has been particularly shown and described in conjunction with preferred embodiments thereof, it will be readily appreciated by those of ordinary skill in the art that various changes may be made without departing from the spirit and scope of the invention. For example, the valve of the present invention is described as operating in either 12 phases (in one embodiment) or 6 phases (in another embodiment). However, the number of phases as described herein is merely representative of the present invention and it should be understood that the valve of the present invention may embody any number of phases.

As another example, the particular shape of the various components of the valve have been described and shown in the drawings. But the present invention is not limited solely to such structural design and may be modified within the capability of one of ordinary skill in the art. For example, the valve has been shown as having circular components for the most part, but various components may be modified and have other shapes (e.g. square, octagonal, etc.), such as the top and bottom housings of the inventive valve. Moreover, various particular dimensions may be modified from that shown.

Therefore, it is intended that the appended claims be interpreted as including the embodiments described herein, the alternatives mentioned above, and all equivalents thereto.

What is claimed is:

1. A lawn sprinkler system, comprising:

a master controller having an input coupled to a water supply and an output, said master controller adapted to be preprogrammed to supply water from the input to the output for a predetermined plurality of phases of operation, said master controller advancing to a subsequent phase of operation by discontinuing the supply of water from the input to the output for a predetermined amount of off time followed by supplying the water from the input to the output for a predetermined amount of on time;

first and second valves each having an in-port and an out-port, adapted to operate in each of said predetermined plurality of phases of operation and adapted to advance to a subsequent phase of operation upon discontinuation of water supplied under pressure to the in-port followed by the supply of water under pressure to the in-port, said first valve being pre-set to supply water received by its in-port to its out-port only during one of said predetermined plurality of phases of operation;

said second valve being pre-set to supply water received by its in-port to its out-port only during another of said predetermined plurality of phases of operation, said one and said another of said predetermined plurality of phases of operation being different;

tube coupling the output of the master controller to both said in-port of said first valve and said in-port of said second valve, wherein each of said first and second valves includes:
  a housing having a chamber, said housing including the in-port and the out-port;
  a piston disposed within the chamber of the housing, the piston including a sealing disk adapted to divide the chamber into separated top and bottom chambers, said sealing disk having a top surface defining a surface of the top chamber and a bottom surface defining a surface of the bottom chamber, said in-port being coupled to the bottom chamber, said out-port being disposed above the sealing disk, said piston being movable upwards and downwards within the chamber in accordance with pressure on the piston;
  said piston being adapted to rotate within the chamber of the housing a first predetermined distance when the piston rises within the chamber to a predetermined first position;
  said piston being adapted to rotate within the chamber of the housing a second predetermined distance when the piston descends within the chamber, in accordance with a release of pressure, to a predetermined second position;
  said sealing disk including a sealing disk port hole extending between the top and bottom surfaces of the sealing disk and having substantially the same size as the out-port of the housing, said sealing disk port hole being adapted to supply water within the bottom chamber of the housing to the out-port when the sealing disk port hole is at an angular position in coincidence with the out-port.

2. The lawn sprinkler system of claim 1, wherein the piston includes a circular set of piston top teeth disposed on the top surface of the sealing disk and a circular set of piston bottom teeth disposed on the bottom surface of the sealing disk; the housing includes a circular set of housing bottom teeth disposed on a bottom portion of the housing below the piston bottom teeth, and the housing includes a circular set of housing top teeth disposed on a top portion of the housing above the piston top teeth; said housing top teeth and piston top teeth collectively being adapted to rotate the piston said first predetermined distance, and said housing bottom teeth and piston bottom teeth collectively being adapted to rotate the piston said second predetermined distance.

3. A pressure sequence controlled valve, comprising:

a housing having a chamber, said housing including an in-port for receiving a source of liquid into the chamber, and an out-port for supplying liquid out from the chamber;

a piston disposed within the chamber of the housing, the piston including a sealing disk adapted to divide the chamber into separate top and bottom chambers, said sealing disk having a top surface defining a surface of the top chamber and a bottom surface defining a surface of the bottom chamber, said in-port of the housing being coupled to the bottom chamber, said out-port of the housing being disposed above the sealing disk, said piston being movable upwards and downwards within the chamber in accordance with pressure on the piston;

said piston being adapted to rotate within the chamber of the housing a first predetermined distance when the piston rises within the chamber to a predetermined first position;

said piston being adapted to rotate within the chamber of the housing a second predetermined distance when the piston descends within the chamber to a predetermined second position;

said sealing disk including a sealing disk port hole extending between the top and bottom surfaces of the sealing disk and having substantially the same size as the out-port of the housing, said sealing disk port hole being adapted to supply liquid within the bottom chamber of the housing to the out-port when the sealing disk port hole is at an angular position in coincidence with the out-port.

4. The pressure sequence controlled valve of claim 3, herein the piston includes a circular set of piston top teeth disposed on the top surface of the sealing disk and a circular set of piston bottom teeth disposed on the bottom surface of the sealing disk; the housing includes a circular set of housing bottom teeth disposed on a bottom portion of the housing below the piston bottom teeth, and the housing includes a circular set of housing top teeth disposed on a top portion of the housing above the piston top teeth; said housing top teeth and piston top teeth collectively being adapted to rotate the piston said first predetermined distance, and said housing bottom teeth and piston bottom teeth collectively being adapted to rotate the piston said second predetermined distance.

5. The pressure sequence controlled valve of claim 4, wherein the circular set of piston top teeth and circular set of housing top teeth each includes a plurality of teeth spaced apart from adjacent teeth, and wherein a gap is provided between each pair of adjacent teeth; the gap between each pair of adjacent teeth in the circular set of housing top teeth is adapted to release liquid and air pressure disposed within the top chamber of the housing.

6. The pressure sequence controlled valve of claim 3, wherein said first and second predetermined distances are equal and correspond to half a phase so that the piston rotates one complete phase upon of the release of pressure on the bottom surface of the sealing disk followed by the supply of pressure on the bottom surface of the sealing disk.

7. The pressure sequence controlled valve of claim 3, wherein said piston is adapted to move upward within the chamber to the first predetermined position upon receipt of continuous pressure on the bottom surface of said sealing disk resulting from a substantially continuous supply of liquid under pressure to the in-port of the housing.

8. The pressure sequence controlled valve of claim 7, wherein said piston is adapted to descend downward within the chamber to the second predetermined position upon a substantially discontinuation of pressure on the bottom surface of said sealing disk.

9. The pressure sequence controlled valve of claim 8, wherein said housing includes means for releasing pressure from within the top chamber of the housing.

10. The pressure sequence controlled valve of claim 3, wherein the housing includes an aperture; said piston includes a stem having a first end coupled to and extending from the sealing disk and a second end extending through the aperture of the housing; said stem rotating with the rotation of the sealing disk; the further comprising an indicator disposed on the second end of the stem and identifying an angular position of the sealing disk within the housing.

11. The pressure sequence controlled valve of claim 10, further comprising a cap detachably coupled to the housing to cover a top of the housing and the indicator.

12. The pressure sequence controlled valve of claim 3, wherein the sealing disk includes a second sealing disk port hole extending between the top and bottom surfaces of the sealing disk at an angular position different from an angular position at which the first sealing disk port hole is disposed, said second sealing disk port hole adapted to supply liquid within the bottom chamber of the housing to the out-port when the second sealing disk port hole is at an angular position in coincidence with the out-port.

13. The pressure sequence controlled valve of claim 3, wherein said piston is adapted to rise, without rotating, within the chamber of the housing from the predetermined first position to a third predetermined position, the top surface of the sealing disk not in contact with a surface of the housing until after the piston is above the predetermined first position so as to minimize wear on the top surface of the sealing disk resulting from any rotation thereof.

* * * * *